United States Patent
Ingram, Jr. et al.

(10) Patent No.: US 7,117,132 B2
(45) Date of Patent: Oct. 3, 2006

(54) SENSITIVITY OF ITERATIVE SPECTRALLY SMOOTH TEMPERATURE/EMISSIVITY SEPARATION TO INSTRUMENT NOISE

(75) Inventors: Paul M Ingram, Jr., Mesquite, TX (US); Archie H Muse, Dallas, TX (US)

(73) Assignee: Raytheon Company, Waltham, MA (US)

( * ) Notice: Subject to any disclaimer, the term of this patent is extended or adjusted under 35 U.S.C. 154(b) by 1086 days.

(21) Appl. No.: 09/917,388

(22) Filed: Jul. 26, 2001

(65) Prior Publication Data

US 2002/0035454 A1    Mar. 21, 2002

Related U.S. Application Data

(60) Provisional application No. 60/221,238, filed on Jul. 27, 2000.

(51) Int. Cl.
*G06F 17/10* (2006.01)
*G06G 7/48* (2006.01)

(52) U.S. Cl. .............................................. 703/2; 703/6
(58) Field of Classification Search .................. 703/2, 703/6
See application file for complete search history.

(56) References Cited

U.S. PATENT DOCUMENTS 6,161,075 A * 12/2000 Cohen ........................... 702/3

FOREIGN PATENT DOCUMENTS

WO    WO 97/04292    2/1997

OTHER PUBLICATIONS

Gillespie, Alan, et al, "*A Temperature and Emissivity Separation Algorithm for Advanced Spacebome Thermal Emission and Reflection Radiometer (ASTER) Images*", IEEE Transactions on Geoscience and Remote Sensing, vol. 36, No. 4, Jul. 1, 1998, pp. 1113-1126.

Borel, Christoph, "*Surface Emissivity and Temperature Retrieval for a Hyperspectral Sensor*", Geoscience and Remote Sensing Symposium Proceedings, 1998, IGARSS '98, 1998 IEEE International Seattle, WA Jul. 6-10, 1998, pp. 546-549.

Khan, Mansoor A., et al, "*Noncontact Temperature Measurement. II. Least Squares Based Techniques*", Review of Scientific Instruments, American Institute of Physics, vol. 62, No. 2, Feb. 1, 1991, pp. 403-409.

Shunlin Liang, "*A New Algorithm for Retrieving Land Surface Temperature and Emissivity and Applications to Airborne Hyperspectral SEBASS Data*", Geoscience and Remote Sensing Symposium Proceedings, 1998, IGARSS '98, 1998 IEEE International Seattle, WA Jul. 6-10, 1998, pp. only 550, 552.

International Search Report dated Mar. 7, 2002 for PCT/US 01/23690 filed Jul. 27, 2001.

(Continued)

*Primary Examiner*—Hugh Jones
(74) *Attorney, Agent, or Firm*—Baker Botts L.L.P.

(57) ABSTRACT

A method for estimating the error statistic for retrieved temperature and emissivity of a surface material includes determining the second order analytical error propagation from a measured radiance that differs from the true radiance by additive gaussian noise, which is independent in each band. The radiance error is translated into a diagonal covariance matrix and an analytical estimate results in a determination of the standard deviation and bias of surface temperature. Further, the method for estimating the error statistic utilizes Monte Carlo simulation from a sufficiently large ensemble of radiance spectra for the retrieved surface temperature and emissivity. Temperature and emissivity of the surface material were retrieved using ISSTES algorithm.

21 Claims, 8 Drawing Sheets

OTHER PUBLICATIONS

Borel, Christoph C., *"Iterative Retrieval of Surface Emissivity and Temperature for a Hyperspectral Sensor"*, First JPL Workshop on Remote Sensing of Land Surface Emissivity, held at JPL, May 6-8, 1997, pp. 1-5.

Kaiser, Robert D., *"Quantitative Comparison of Temperature/Emissivity Algorithm Performance Using SEBASS Data"*, in Algorithms for Multispectral and Hyperspectral Imagery V, Sylvia S. Shen, Michael R. Descour, Editors, Proceedings of SPIE vol. 3717, pp. 47-57 (Part of the SPIE Conference on Algorithms for Multispectal and Hyperspectral Imagery V. Orlando, FL), Apr. 1999.

Cover Page and LOC publication information page (2 pgs.) for: Bevington, Philip R., *Data Reduction and Error Analysis for the Physical Sciences*, McGraw-Hill, Inc., 1969, LOC Catalog Card No. 69-16942, containing 336 pages.

Cover Page and LOC publication information page (2 pages) for: Sobol, I.M., *The Monte Carlo Method*, The University of Chicago Press, The University of Chicago, 1974, International Standard Book No. 0-226-76749-3, LOC Catalog Card No. 73-89791, containing 107 pages.

* cited by examiner

SENSITIVITY OF ITERATIVE SPECTRALLY SMOOTH TEMPERATURE/EMISSIVITY SEPARATION TO INSTRUMENT NOISE

RELATED APPLICATION

This application claims the benefit of U.S. provisional application Ser. No. 60/221,238, filed Jul. 27, 2000, entitled Sensitivity of Iterative Spectrally Smooth Temperature/Emissivity Separation to Instrument Noise.

TECHNICAL FIELD OF THE INVENTION

This invention relates to determination of the error statistics for retrieved surface temperature and emissivity, and more particularly to determination of error statistics for retrieved surface temperature and emissivity by second-order analytical error propagation and Monte Carlo simulation.

BACKGROUND OF THE INVENTION

The Iterative Spectrally Smooth Temperature-Emissivity Separation algorithm (ISSTES) is an inversion method for retrieving surface temperature and emissivity from remotely sensed hyperspectral thermal infrared radiance. It is important to quantify the error sensitivity for ISSTES—this is needed by system designers in determining system parameters required for a given retrieval error, and is also needed by consumers of the temperature/emissivity products as an indicator of product quality.

SUMMARY OF THE INVENTION

A second-order analytical error model and Monte Carlo simulation are developed in detail and the results presented and compared. In one embodiment, the error statistics are computed for the case of a low-emissivity (0.65) surface at a temperature of 300 K, imaged by the SEBASS LWIR instrument from 2500 ft. through a warm humid atmosphere. With a noise level of 0.6 µW/cm$^2$-sr-µm (equivalent to an SNR of about 1200:1 in this scenario), the contribution of instrument noise to the standard deviation of retrieved temperature was 0.18 K, and the contribution to the standard deviation of retrieved spectral emissivity varied in the range 0.002–0.004 as a function of band number. The performance of ISSTES for sensors with lower SNR is discussed. ISSTES should give approximately unbiased surface temperature and emissivity estimates for noise levels below about 1 µW/cm$^2$-sr-µm (SNR>750:1). Higher noise levels could result in biases due to non-linearity of the inversion within the radiance error bars. ISSTES converged successfully for noise levels up to about 5 µW/cm$^2$-sr-µm (SNR>150:1), but showed significant probability of non-convergence at higher noise levels.

BRIEF DESCRIPTION OF THE DRAWINGS

For a more complete understanding of the present invention and the advantages thereof, reference is now made to the following description taken in connection with the accompanying drawings.

DETAILED DESCRIPTION OF THE INVENTION

Figure 1:
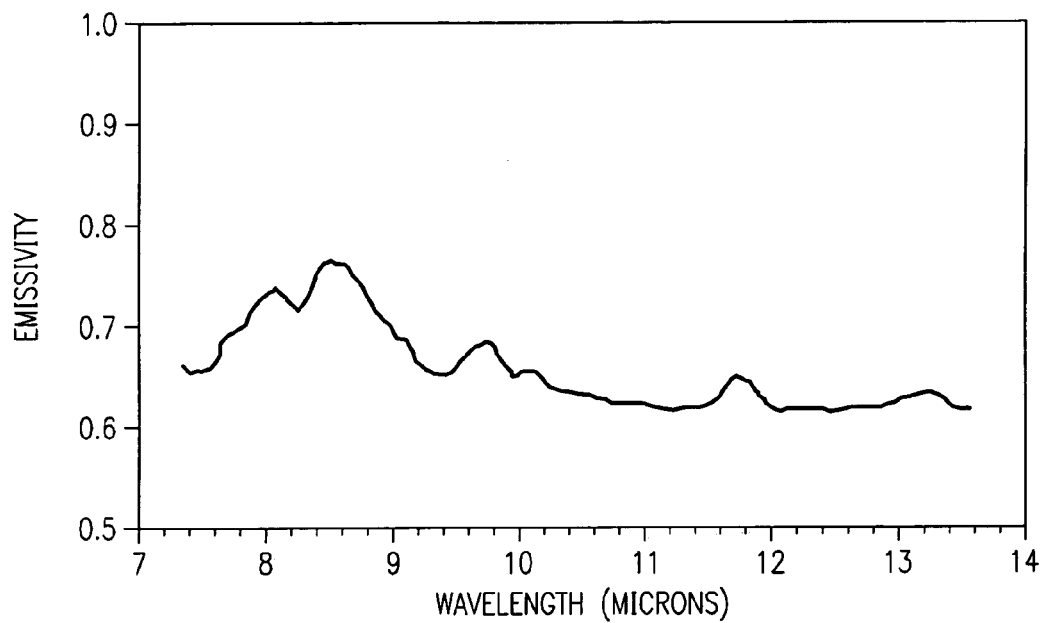
FIG. 1 is a plot of emissivity versus wavelength (microns) for a test panel emissivity.

An important problem in remote sensing is the retrieval of land surface temperature and spectral emissivity from airborne/spaceborne hyperspectral thermal infrared (TIR) data. A terrestrial surface with temperature t and emissivity ε radiates a TIR spectral signature that propagates through the atmosphere to the instrument's entrance aperture, where it appears as the radiance L. (A symbol in boldface type denotes a vector or matrix quantity.) The forward model at the individual band level is given by:

$$L = \begin{pmatrix} L_1 \\ \vdots \\ L_N \end{pmatrix} \quad (1.1a)$$

$$L_i = \tau_i \varepsilon_i B_i(t) + \tau_i (1 - \varepsilon_i) L_i^{down} + L_i^{up} \quad (1.1b)$$

In equation 1.1b, i is band number (i=1, ..., N), $B_i(t)$ is the average Planck blackbody radiance in band i, and $\tau_i$, $L_i^{up}$ and $L_i^{down}$ are the atmospheric transmission between ground and sensor, atmospheric upwelling radiance at the sensor, and the atmospheric downwelling radiance plus solar radiance at the ground.

The ISSTES algorithm provides an inversion method that maps L back to surface temperature and emissivity, denoted $(\hat{t}, \hat{\epsilon})$. (A circumflex over a symbol denotes a retrieved value.) Specifically, by iteration the value $\hat{t}$ that minimizes the spectral smoothness measure S:

$$S = \sum_{i=2}^{N-1} \left\{ \varepsilon_i - \frac{\varepsilon_{i-1} + \varepsilon_i + \varepsilon_{i+1}}{3} \right\}^2 \tag{1.2a}$$

$$\varepsilon_i = \frac{L_i - L_i^{up} - \tau_i L_i^{down}}{\tau_i (B_i(t) - L_i^{down})} \tag{1.2b}$$

The retrieved emissivity $\hat{\epsilon}$ is then given by $\hat{\epsilon} = \epsilon(\hat{t})$.

For most surface materials the error in the retrieved temperature and emissivity is small if L is known exactly. (It is also assumed that $\tau$, $L^{up}$ and $L^{down}$ are known exactly). However, in practice L is not known exactly—there is at least some measurement noise, whose magnitude depends on the sensor design and operation. These errors in L propagate through the retrieval process and emerge as errors in estimated surface temperature and emissivity.

In accordance with this invention, there is developed a method for estimating the errors in retrieved temperature and emissivity from the magnitude and distribution of the measurement noise. Such method is useful to instrument designers as a guide in determining the appropriate instrument noise level required for a given retrieval accuracy, and is also useful to consumers of the temperature/emissivity products as an indicator of product quality.

The error statistics for retrieved surface temperature and emissivity is estimated in two ways: second-order analytical error propagation and Monte Carlo simulation. Each technique has advantages and disadvantages. The analytical model provides limited information about the distribution of temperature and emissivity errors, namely the first two moments. The estimate of the mean includes second-order terms in the Taylor series expansion of the retrieval function and can therefore test for biased retrievals. The estimate of the standard deviation includes first-order terms. By postulating a structure for the covariance of the instrument noise and assuming that the retrieval function is quadratic within these error bars, the analytical model has the advantage of real-time performance and therefore can be used in an operational retrieval algorithm to provide product quality estimates. Monte Carlo simulation involves retrieving surface temperature and emissivity from sufficiently large ensembles of radiance spectra. This technique has the drawback of non-real-time performance, but yields more information than the analytical model, namely an empirical distribution of the errors. This distribution includes information not accounted for by the analytical model, such as the presence of statistical outliers resulting from non-convergence or incorrect convergence of the algorithm. Comparison of the two methods reinforces any conclusions implied by one method and identifies parameter ranges where the linear and quadratic approximations, inherent in analytical error propagation, begin to break down.

In accordance with one embodiment, the simulation consisted of a surface at an assumed temperature of 300 K and with the low spectral emissivity as shown in FIG. 1. Most other temperature/emissivity separation algorithms would be expected to perform poorly on this test case due to their underlying assumptions, whereas ISSTES should perform well.

Figure 2:
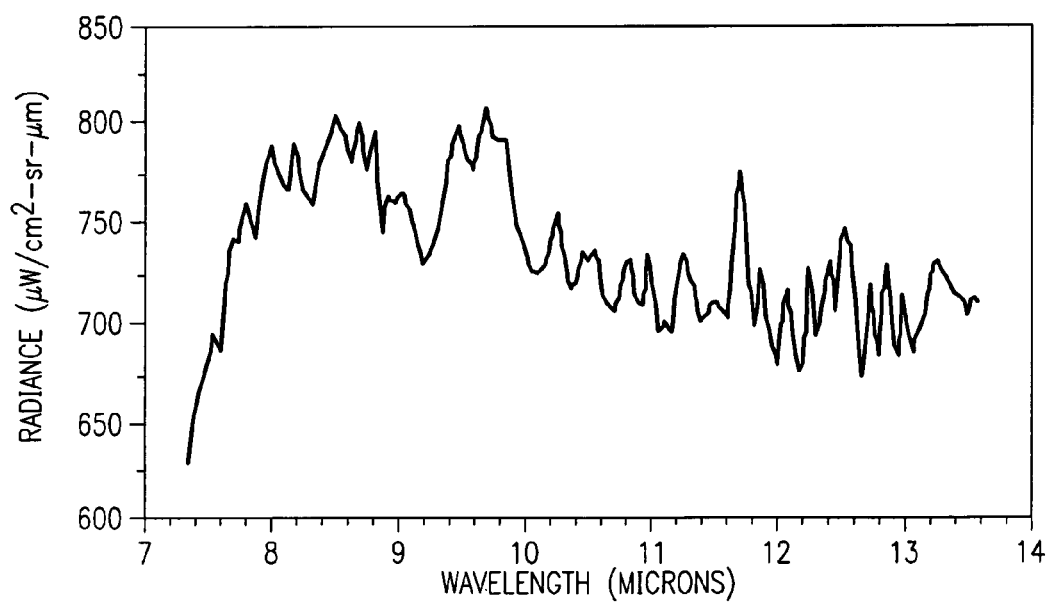
FIG. 2 is a plot of radiance versus wavelength (microns) illustrating entrance aperture spectral radiance.

The terms $\tau$, $L^{up}$ and $L^{down}$ of equation 1.2b were generated using MODTRAN with atmospheric profiles measured in central Oklahoma during June 1997, with surface air temperature at about 300 K and relative humidity consistently near 80%. The resulting entrance aperture radiance is shown in FIG. 2.

The second order analytical error model for ISSTES and the Monte Carlo error simulation technique will be discussed in detail. Monte Carlo simulation and analytical propagation techniques are applied to evaluate the error in retrieved surface temperature and emissivity arising from random instrument noise.

Analytical Error Model for ISSTES, given a variable X (an N×1 vector) and a scalar-valued non-linear function y=F(X), analytical error propagation provides a technique for estimating error statistics for y in terms of those for X and the partial derivatives of F(X). When the range of errors in X are small enough that F(X) can be accurately represented by a first-order approximation, F(X) is said to be "linear within the error bars for X", and it is only necessary to expand the function y=F(X) in a first order Taylor series about X:

$$y + \delta y \approx F(X) + \frac{dF}{dX} \delta X \tag{2.1a}$$

$$\delta y \approx \frac{dF}{dX} \delta X \tag{2.1b}$$

$$\sigma_{\delta y}^2 \approx \frac{dF}{dX} \Gamma_{\delta X} \frac{dF^t}{dX} \tag{2.1c}$$

where $$\frac{dF}{dX}$$

is the Jacobian matrix (1×N) of the first partial derivatives of F(X), $\delta X$ represents the perturbing random variable, $\Gamma_{\delta X}$ represents the covariance matrix (N×N) of $\delta X$, $\delta y$ represents the resulting random error in the dependent variable, $\sigma_{\delta y}^2$ is the variance of $\delta y$ and superscript-t denotes matrix transpose. (The convention of expressing the derivative of a scalar function, F(X), with respect to a column vector, X, as a row vector has been adopted so that the Taylor series may be expressed without the use of the transpose operator.) Note that equation 2.1c is valid without restriction on the error distribution of $\delta X$, and that an unbiased noise source (i.e., $<\delta X>=0$) results in an unbiased random error in the dependent variable, $<\delta y>=0$.

When the errors $\delta X$ are so large that F(X) is not adequately represented by a first order expansion, F(X) is said to be "non-linear within the error bars for X." In such cases a second order expansion can be undertaken:

$$\delta y \approx \frac{dF}{dX} \delta X + \frac{1}{2} \delta X^t \frac{d^2 F}{dX^2} \delta X \tag{2.2a}$$

-continued $$\beta_{\delta y} = \langle \delta y \rangle \approx \frac{1}{2}\text{trace}\left(\Gamma_{\delta X}^{\frac{1}{2}} \frac{d^2 F}{dX^2} \Gamma_{\delta X}^{\frac{1}{2}}\right) \quad (2.2b)$$

where $$\frac{d^2 F}{dX^2}$$

is the Hessian matrix (N×N) of the second partial derivatives of F(X). Equation 2.2b assumes that errors in X have a Gaussian distribution and that $\langle \delta X \rangle = 0$. The result is clear for uncorrelated errors, where the matrix $\Gamma_{\delta X}$ is diagonal. The result for correlated errors follows from the uncorrelated case by changing variables to a coordinate system in which $\Gamma_{\delta X}$ is diagonal, and noting that the trace operation is invariant under the orthogonal transformation used in the diagonalization. Note that in general, a function F(X) that is non-linear within the error bars for X results in a biased random error in the dependent variable, $\langle \delta y \rangle \neq 0$, even for an unbiased noise source (i.e., $\langle \delta X \rangle = 0$). This resulting bias, denoted $\beta_{\delta y}$, is given by the expression on the right hand side of equation 2.2b.

If the function is not given explicitly in the form y=F(X), but instead is defined implicitly as the level set of another function G:

$$G(X, y) = 0 \quad (2.3)$$

Then under certain conditions on G (the implicit function theorem), equation 2.3 implies that y can be expressed as a function of X. However, it is usually difficult to write down an explicit representation of this function in closed form y=F(X) amenable to differentiation. Nevertheless, equations 2.1 and 2.2 can still be applied because what these equations require is not F(X) but its derivatives, and these can be written in terms of those for G(X, y). The first derivative of F(X) can be obtained by implicit differentiation of equation 2.3:

$$\frac{\partial G}{\partial X} + \frac{\partial G}{\partial y}\frac{dF}{dX} = 0 \Rightarrow \quad (2.4a)$$

$$\frac{dF}{dX} = -\left(\frac{\partial G}{\partial y}\right)^{-1}\frac{\partial G}{\partial X} \quad (2.4b)$$

Note in equation 2.4b that $$\frac{\partial G}{\partial y}$$

is a scalar, and $$\frac{dF}{dX} \text{ and } \frac{\partial G}{\partial X}$$

are 1×N vectors.

Similarly, the second derivative of F(X) can be written by differentiating equation 2.4b:

$$\frac{d^2 F}{dX^2} = -\left(\frac{\partial G}{\partial y}\right)^{-1}\left(\frac{\partial^2 G}{\partial X^2} + \frac{\partial^2 G^t}{\partial y \partial X}d\frac{F}{dX}\right) + \quad (2.5)$$

$$\left(\frac{\partial G}{\partial y}\right)^{-2}\left(\frac{\partial G}{\partial X}\right)^t \left(\frac{\partial^2 G}{\partial X \partial y} + \frac{\partial^2 G}{\partial y^2}d\frac{F}{dX}\right)$$

Note in equation 2.5 that $$\frac{\partial^2 G}{\partial y^2}$$

is a scalar, $$\frac{\partial^2 G}{\partial X \partial y} \text{ and } \frac{\partial^2 G}{\partial y \partial X}$$

are 1×N vectors, and $$\frac{d^2 F}{dX^2} \text{ and } \frac{\partial^2 G}{\partial X^2}$$

are N×N symmetric matrices.

This general approach will now be applied to estimate the covariance and bias of surface temperature and emissivity errors retrieved using ISSTES. Let the symbols $(\hat{t}, \hat{\epsilon})$ denote both the inverse mapping implied by the algorithm and the retrieved values:

$$L \xrightarrow{(\hat{t}, \hat{\epsilon})} (\hat{t}, \hat{\epsilon}) \quad (2.6)$$

Recall that $\hat{t}$ is defined as the temperature that minimizes the smoothness measure S in equation 1.2. Near a solution, this condition can be re-expressed in terms of the derivative of S:

$$\frac{\partial S(L, \hat{t})}{\partial t} = 0 \quad (2.7)$$

Equation 2.7 is of the form in equation 2.3 and implicitly defines $\hat{t}$ as a function of L, $\hat{t}=\hat{t}(L)$. Therefore equations 2.4 and 2.5 can be applied to $$\frac{\partial S}{\partial t}$$

to write the derivatives $$\frac{d\hat{t}}{dL} \text{ and } \frac{d^2 \hat{t}}{dL^2}:$$

-continued $$\frac{d\hat{t}}{dL} = -\left(\frac{\partial^2 S}{\partial t^2}\right)^{-1} \frac{\partial^2 S}{\partial L \partial t} \quad (2.8a)$$

$$\frac{d^2\hat{t}}{dL^2} = -\left(\frac{\partial^2 S}{\partial t^2}\right)^{-1}\left[\frac{\partial^3 S}{\partial L^2 \partial t} + \left(\frac{\partial^3 S}{\partial L \partial t^2}\right)^t \frac{d\hat{t}}{dL}\right] + \left(\frac{\partial^2 S}{\partial t^2}\right)^{-2}\left(\frac{\partial^2 S}{\partial L \partial t}\right)^t\left(\frac{\partial^3 S}{\partial L \partial t^2} + \frac{\partial^3 S}{\partial t^3}\frac{d\hat{t}}{dL}\right) \quad (2.8b)$$

In computing equations 2.8, it is helpful to write S in terms of the (N−2)×N matrix K of second order differences, so that (up to a multiplicative constant which can be ignored):

$$S = \frac{1}{2}\varepsilon^t K^t K \varepsilon \quad (2.9a)$$

$$K = \begin{pmatrix} -1 & 2 & -1 & & & \\ & -1 & 2 & -1 & & \\ & & & \ddots & & \\ & & & & -1 & 2 & -1 \end{pmatrix} \quad (2.9b)$$

Differentiating equation 2.9 produces, via matrix operations, an analytically convenient expression for $$\frac{\partial S}{\partial t}:$$

$$\frac{\partial S}{\partial t} = \varepsilon^t K^t K \frac{\partial \varepsilon}{\partial t} \quad (2.10)$$

where $\epsilon$ and $$\frac{\partial \varepsilon}{\partial t}$$

are obtained from equation 1.2. The higher-order derivatives of $$\frac{\partial S}{\partial t}$$

required in equations 2.8a, 2.8b can be readily written down in similar manner. The derivatives in equations 2.8a, 2.8b can then be substituted in equations 2.1 and 2.2 to estimate the covariance and bias of $\hat{t}$.

The covariance and bias of retrieved emissivity can be estimated in a similar manner using equations 2.1 and 2.2 once $$\frac{d\hat{\varepsilon}_i}{dL} \text{ and } \frac{d^2\hat{\varepsilon}_i}{dL^2}$$

have been derived. But $$\frac{d\hat{\varepsilon}_i}{dL}$$

can be obtained by differentiating the definition $\hat{\epsilon}=\epsilon(\hat{t})$ with respect to L:

$$\frac{d\hat{\varepsilon}_i}{dL} = \frac{\partial \varepsilon_i}{\partial L} + \frac{\partial \varepsilon_i}{\partial t}\frac{d\hat{t}}{dL} \quad (2.11)$$

Note in equation 2.11 that $$\frac{\partial \varepsilon_i}{\partial t}$$

is a scalar, and $$\frac{d\hat{\varepsilon}_i}{dL}, \frac{d\varepsilon_i}{dL} \text{ and } \frac{d\hat{t}}{dL}$$

are 1×N vectors.
Finally, $$\frac{d^2\hat{\varepsilon}_i}{dL^2}$$

can be obtained by differentiating equation 2.11:

$$\frac{d^2\hat{\varepsilon}_i}{dL^2} = \frac{\partial^2 \varepsilon_i}{\partial L^2} + \left[\left(\frac{\partial^2 \varepsilon_i}{\partial t \partial L}\right)^t \frac{d\hat{t}}{dL} + \left(\frac{d\hat{t}}{dL}\right)^t \frac{\partial^2 \varepsilon_i}{\partial L \partial t}\right] + \frac{\partial \varepsilon_i}{\partial t}\frac{d^2\hat{t}}{dL} + \frac{\partial^2 \varepsilon_i}{\partial t^2}\left(\frac{d\hat{t}}{dL}\right)^t \frac{d\hat{t}}{dL} \quad (2.12)$$

Note in equation 2.12 that $$\frac{\partial^2 \varepsilon_i}{\partial L^2}$$

is zero from equation 1.2, $$\frac{\partial^2 \varepsilon_i}{\partial L \partial t} \text{ and } \frac{d\hat{t}}{dL}$$

are 1×N vectors, and $$\frac{d^2\hat{\varepsilon}_i}{dL^2} \text{ and } \frac{d^2\hat{t}}{dL^2}$$

are N×N symmetric matrices.

In summary, equations 2.1 and 2.2 can be used to estimate the covariance and bias for surface temperature and emissivity retrieved by the ISSTES algorithm, where the required derivatives of $\hat{t}$ are given by equation 2.8, and the derivatives of $\hat{\epsilon}$ are given by equations 2.11 and 2.12.

Figure 3:
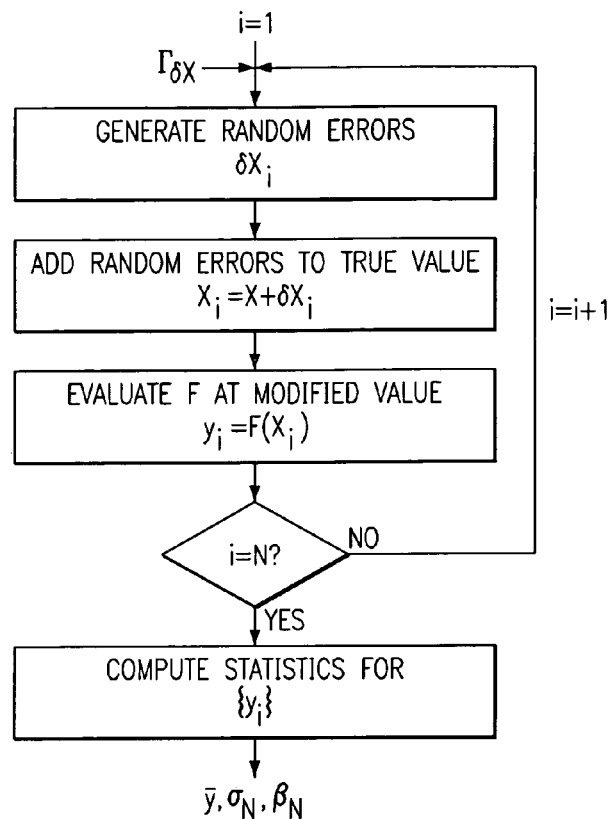
FIG. 3 is a flow chart of Monte Carlo simulation in accordance with the present invention.

Given a variable X and a function y=F(X) as described previously, Monte Carlo simulation provides a technique for generating an empirical approximation of the error distribution for y in terms of the distribution for X and the function F(X). The Monte Carlo simulation process is illustrated in FIG. 3.

The covariance $\Gamma_{\delta X}$ of the measurement variables is used to generate an unbiased ensemble of measurement errors. These errors are added to the vector X, to produce an ensemble simulating the results of making the same measurement many times, each time with slightly different errors. This ensemble of measurements is then evaluated using the function F(X) to give an ensemble of dependent variables, which can then be used to estimate the mean, bias and variance of the dependent variable according to the following equations:

$$\bar{y}_N = \frac{1}{N}\sum_{i=1}^{N} y_i \qquad (3.1a)$$

$$\sigma_N^2 = \frac{1}{N-1}\sum_{i=1}^{N} (y_i - \bar{y}_N)^2 \qquad (3.1b)$$

$$\beta_N = \bar{y}_N - y \qquad (3.1c)$$

This general approach will be applied to compute the error distribution for simulated measurements of a low emissivity material as described. Specifically, X is the radiance spectrum of FIG. 2, and F(X) is the ISSTES retrieval function previously outlined, implemented using Newton's method. Each band (i.e. element of X) has an independent associated noise variable, and the generation of each element in an ensemble will involve selecting different pseudo-random numbers as the noise values for each band. The surface temperature and emissivity are retrieved from each spectrum in an ensemble, the temperature and emissivity errors are calculated, the error distribution is compiled, and the error statistics estimated according to equations 3.1.

The ensemble size N needs to be chosen large enough that statistically significant estimates of the surface temperature bias can be made. The specific condition on N is shown in equation 3.2 where β is the bias of equation 3.1c, e.g. for retrieved surface temperature.

$$|\bar{y}_N - \bar{y}| << \beta \qquad (3.2)$$

Figure 4:
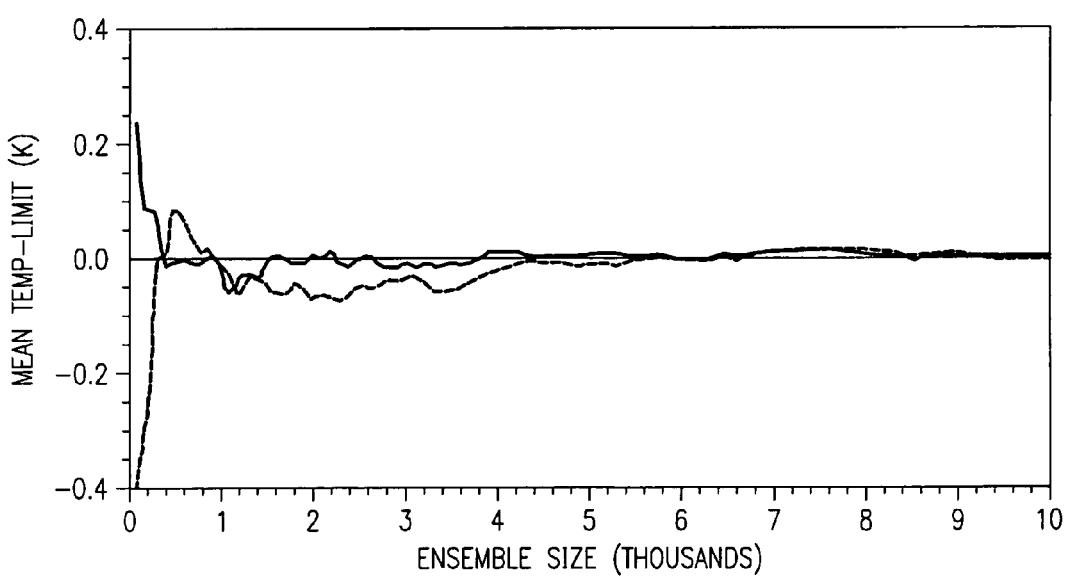
FIG. 4 is a plot of mean temperature versus ensemble size (thousands) for Monte Carlo simulation.

This was done informally by computing $\bar{y}_N$ for increasing values of N, and then plotting the difference $\bar{y}_N - \bar{y}_{limit}$. An example is shown in FIG. 4 for two noise levels. The choice of N=10,000 appears to satisfy the condition in equation 3.2 for surface temperature biases as low as 0.03 K.

The following describes the results of applying analytical error and Monte Carlo simulation to the test case first discussed, measured in the presence of random instrument noise. It is assumed that the measured radiance $\hat{L}$ differs from the true radiance L by additive Gaussian noise, which is independent in each band. Denoting the noise in channel i by the random variable $v_i$:

$$\hat{L}_i = L_i + v_i \quad i=1,\ldots N \qquad (4.1)$$

For simplicity it is also assumed that the noise level has the same value v in all bands, so that each $v_i$ has zero mean and variance $v^2$.

In the analytical error model, the condition above translates into a diagonal covariance matrix for the radiance error that has the following form:

$$\Gamma_{\delta L} = \begin{pmatrix} v^2 & & & & \\ & v^2 & & & \\ & & \ddots & & \\ & & & \ddots & \\ & & & & v^2 \end{pmatrix} \qquad (4.2)$$

Figure 5:
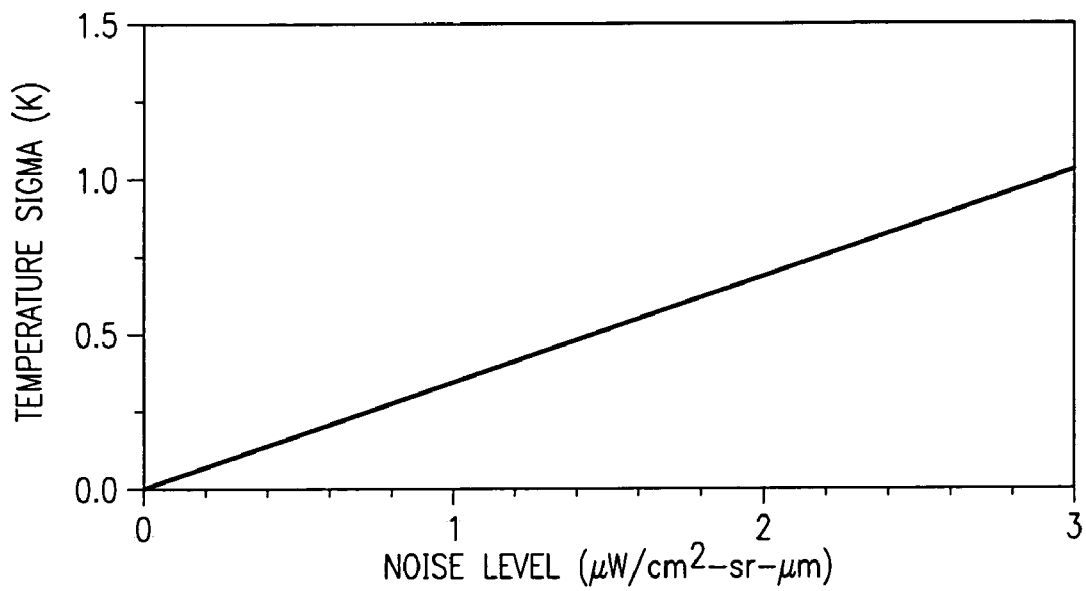
FIG. 5 is a plot of temperature Sigma versus noise level illustrating standard deviation of estimated surface temperature.
Figure 6:
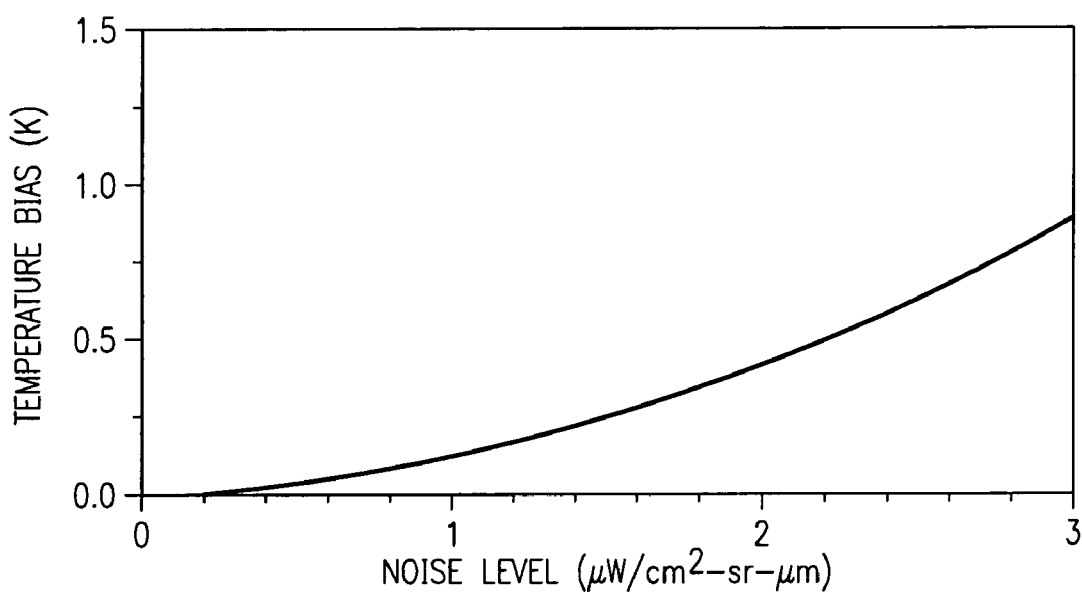
FIG. 6 is a plot of temperature bias versus noise level illustrates surface temperature bias from analytical model evaluation showing the bias of the estimated surface temperature.

The analytical estimates for the standard deviation and bias of surface temperature are shown in FIGS. 5 and 6.

For a spectrometer such as SEBASS [2], the noise level v=0.6 μW/cm²-sr-μm gives an SNR of about 1200:1 in this example. This noise level results in a standard deviation of surface temperature of about 0.18 K and a bias of about 0.03 K.

For other sensors, noise levels can be higher. At noise levels of 3 μW/cm²-sr-μm, corresponding to an SNR of 240:1, the standard deviation of surface temperature reaches about 0.88 K and the surface temperature bias reaches a value of about 0.70 K. The implication for such instruments, at least in this scenario, is that instrument noise levels should be kept below about 1 μW/cm²-sr-μm if the ISSTES algorithm is to give approximately unbiased temperature retrievals. This corresponds to an SNR of 720:1 and implies a lower bound on the sensor integration time or spectral resolution.

Figure 7:
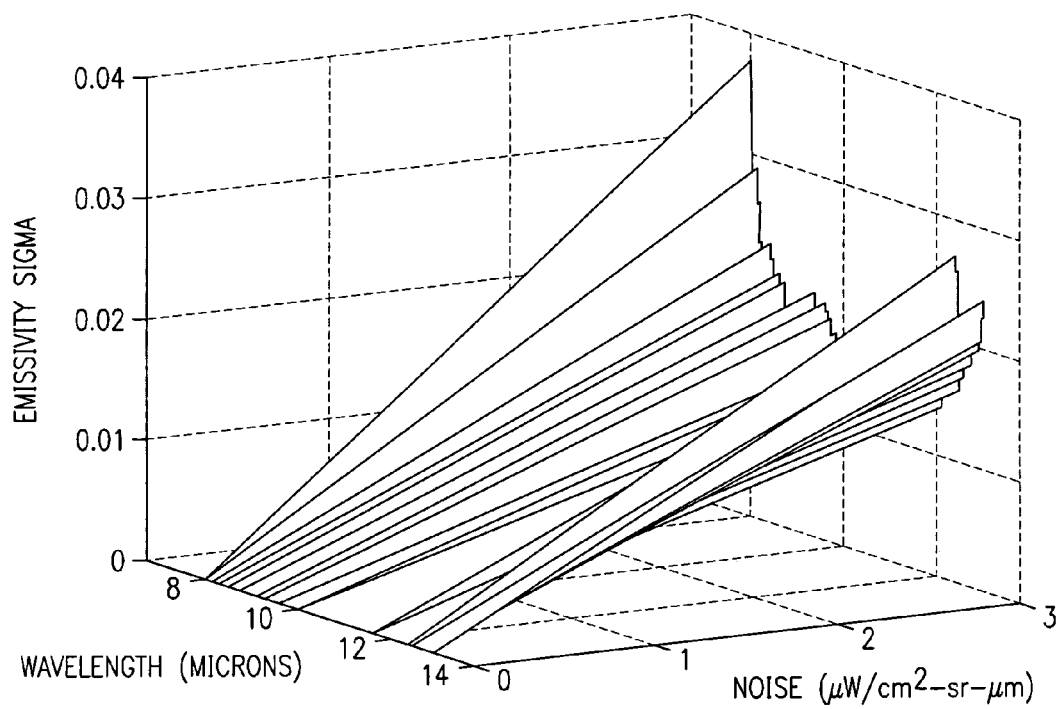
FIG. 7 is a three-dimensional plot of an analytical estimate of emissivity Sigma showing standard deviation of the estimate surface emissivity.
Figure 8:
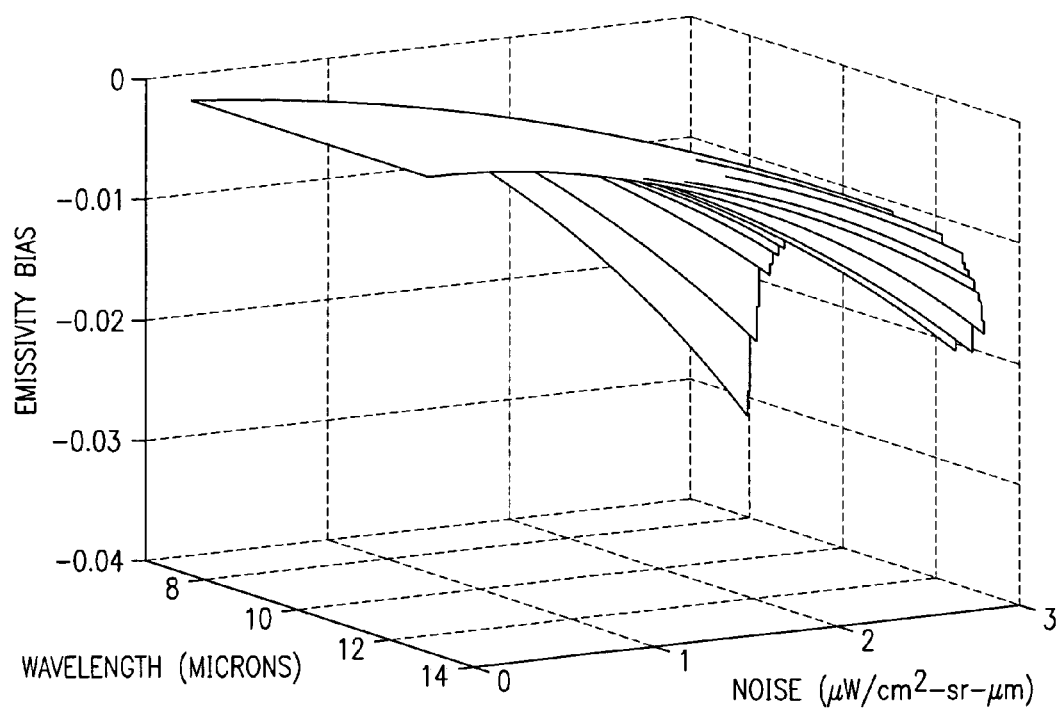
FIG. 8 is a three-dimensional plot for an analytical estimate of emissivity bias showing bias of the estimated surface emissivity.

The analytical estimates for the standard deviation and bias of surface emissivity are shown in FIGS. 7 and 8.

For SEBASS, the contribution to the standard deviation of surface emissivity is in the range 0.002–0.004, increasing near the edges of the wavelength region due to the loss of signal from the surface caused by increased atmospheric absorption at these wavelengths. The surface emissivity bias has the opposite sign as the temperature bias (as expected by conservation of energy), and is in the range −0.0004−−0.0008.

For noise levels of 3 μW/cm²-sr-μm, standard deviation of surface emissivity reaches the 0.015–0.025 range, and the emissivity bias reaches values in the −0.009−−0.015 range. As in the case of retrieved surface temperature, instrument noise levels should be kept below about 1 μW/cm²-sr-μm if the ISSTES algorithm is to give approximately unbiased emissivity retrievals in this scenario.

Figure 9A:
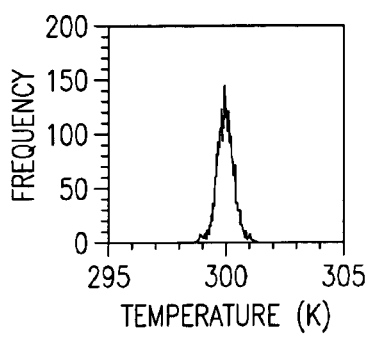
FIGS. 9a, 9b and 9c are plots of frequency versus temperature illustrating distribution of retrieved surface temperature for three scenarios.
Figure 9B:
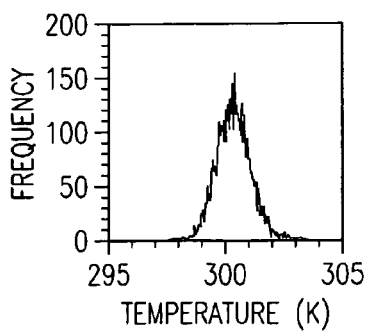
Figure 9C:
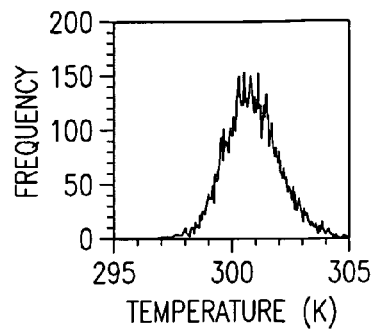

Radiance spectra ensemble sizes of 10,000 were generated for Monte Carlo simulation for different values of v, and the temperature and emissivity were retrieved using the ISSTES algorithm. Histograms for the retrieved surface temperature for v=1, 2 and 3 μW/cm²-sr-μm are shown in FIGS. 9a, 9b and 9c.

Figure 10:
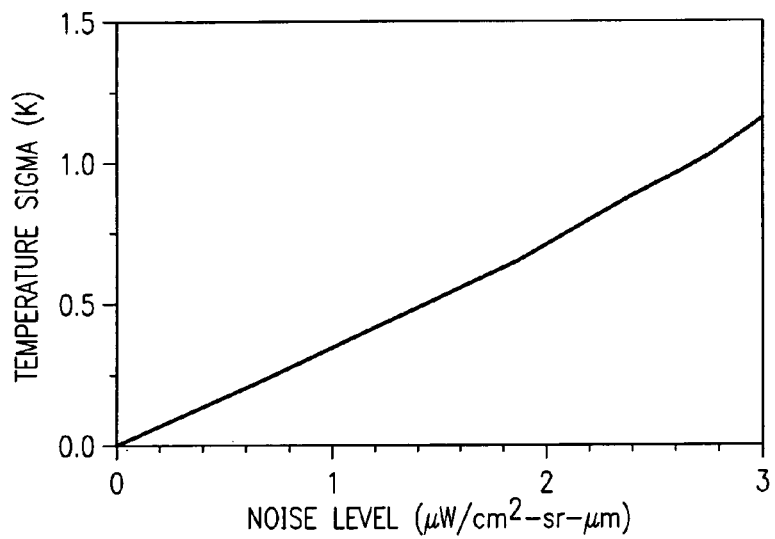
FIG. 10 is a plot of temperature Sigma versus noise level for Monte Carlo simulation showing standard deviation of surface emissivity.
Figure 11:
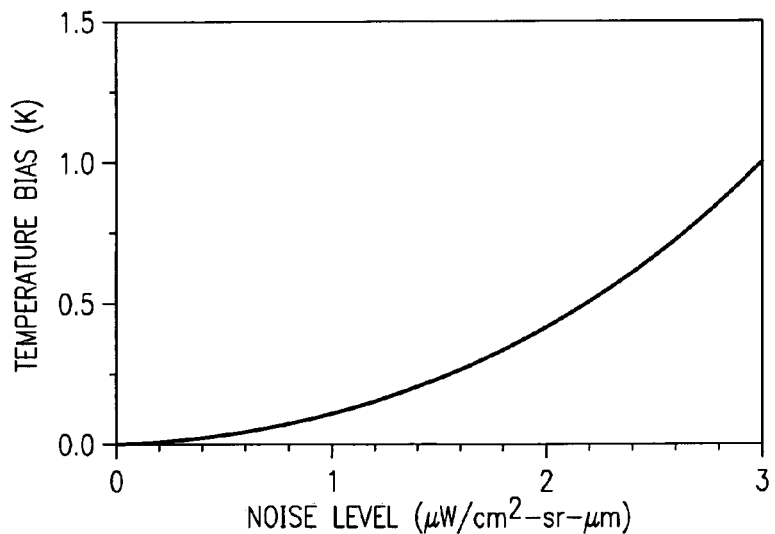
FIG. 11 is plot of temperature bias versus noise level illustrating surface temperature bias for Monte Carlo simulation.

FIG. 10 illustrates that the surface temperature standard deviation increases for increasing noise levels. Also, since the true surface temperature was 300 K, a bias appears as the noise level increases. The surface temperature standard deviation and bias were estimated from these distributions according to equations 3.1 and in FIGS. 10 and 11.

From equations 2.1 and 2.2, standard deviation of surface temperature is approximately linear in noise level, and surface temperature bias is approximately quadratic in noise level. Good agreement with the analytical model was obtained even for relatively high noise levels.

Figure 12:
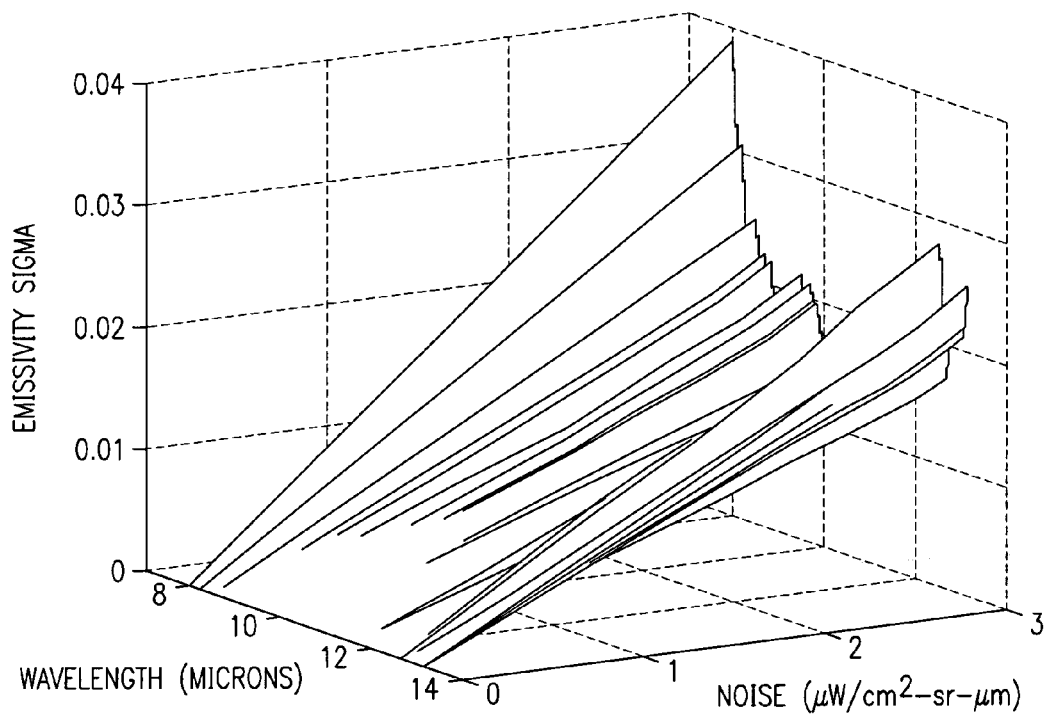
FIG. 12 is a three-dimensional plot illustrating standard deviation of surface emissivity from Monte Carlo simulation.
Figure 13:
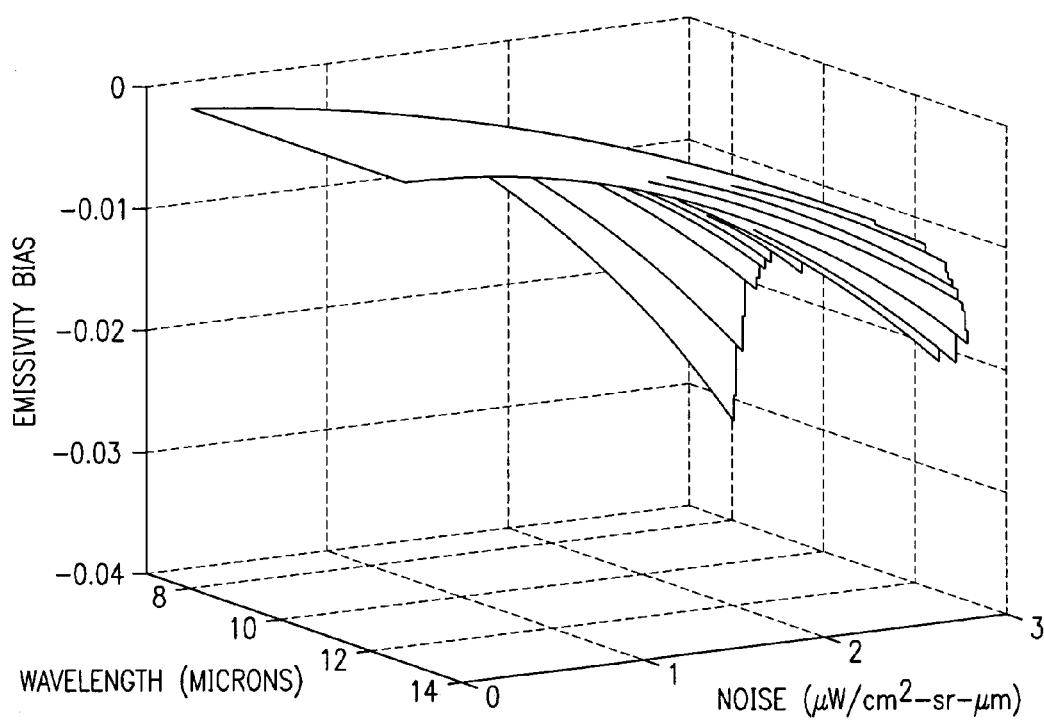
FIG. 13 is a three-dimensional plot showing bias of emissivity from Monte Carlo simulation.

Standard deviation and bias of surface emissivity were computed from the ensembles as well, and plotted in FIGS. 12 and 13. The linear and quadratic dependence of the standard deviation and bias on noise levels is again evident from these figures, and excellent agreement with the analytical results was obtained.

Figure 14:
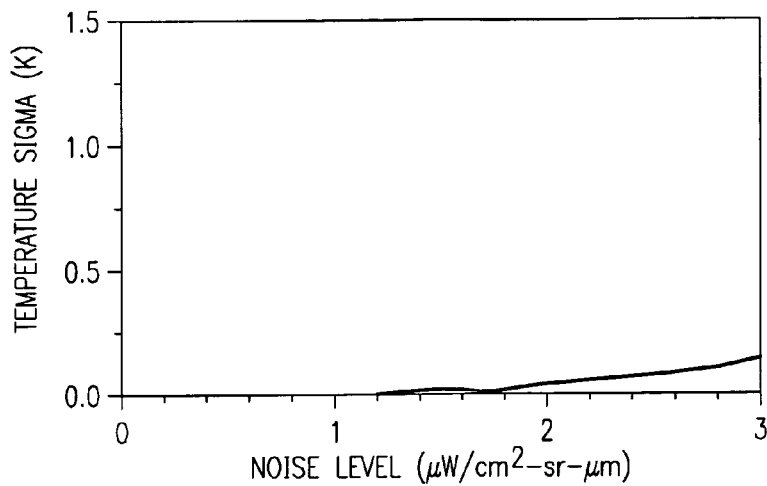
FIG. 14 is a plot of temperature Sigma versus noise level illustrating the difference in analytical/Monte Carlo estimates of standard deviation.
Figure 15:
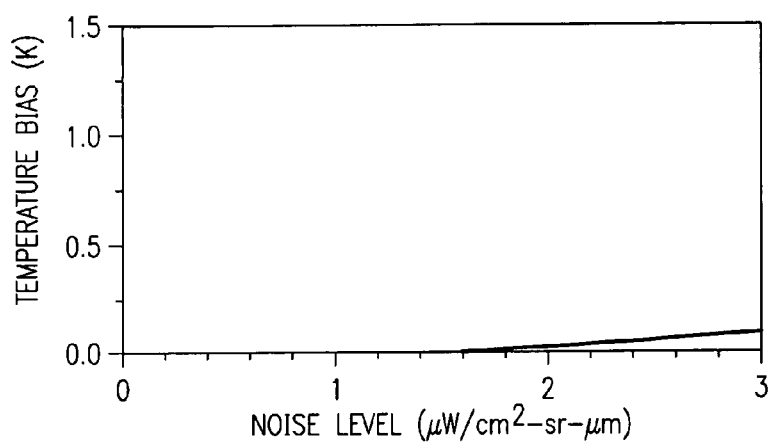
FIG. 15 is a plot of temperature bias versus noise level illustrating the difference in analytical/Monte Carlo estimates of bias.

The differences between the analytical and Monte Carlo estimates for standard deviation and bias of retrieved surface temperature are shown in FIGS. 14 and 15, drawn at the same scale as the previous plots. These Figures indicate that the first-order analytical model for standard deviation and the second-order analytical model for bias are adequate for estimating error statistics of retrieved surface temperature, even for relatively high noise levels of 3 $\mu W/cm^2$-sr-$\mu m$.

Figure 16:
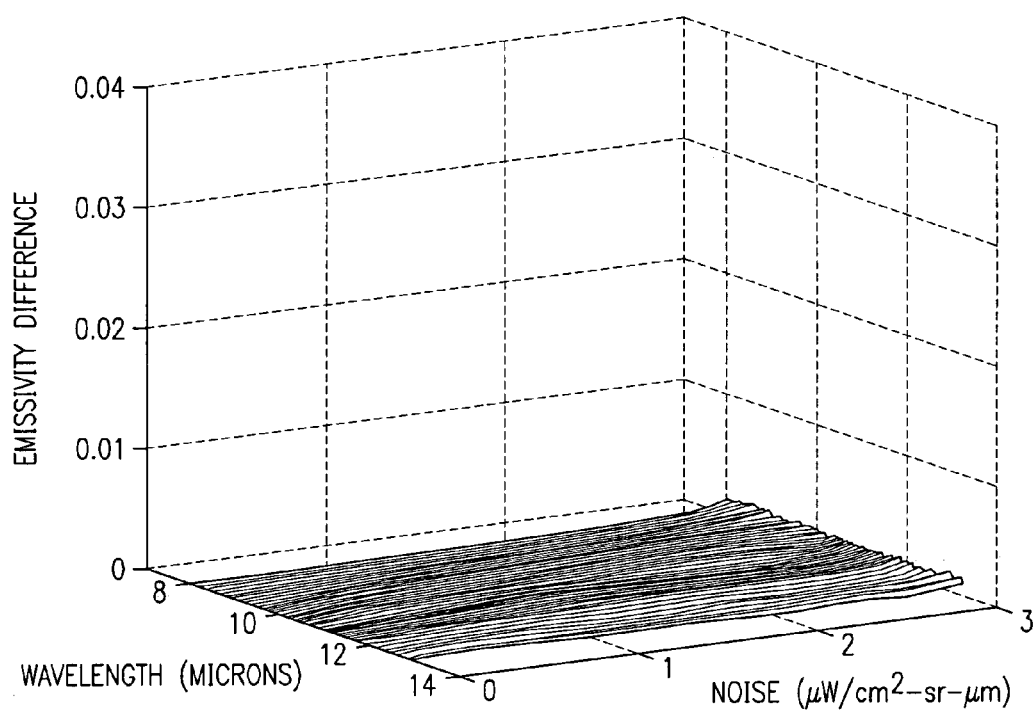
FIG. 16 is a three-dimensional plot showing differences in analytical/Monte Carlo estimates of emissivity standard deviation.
Figure 17:
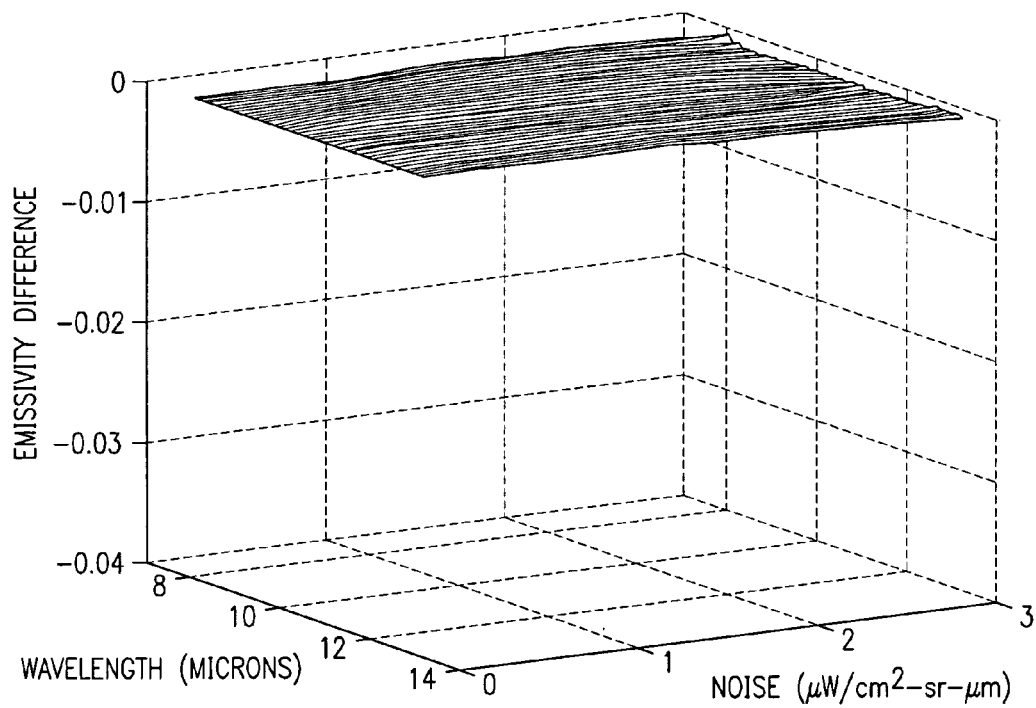
FIG. 17 is a three-dimensional plot illustrating differences in analytical/Monte Carlo estimates of emissivity bias.

The differences between the analytical and Monte Carlo estimates for standard deviation and bias of retrieved surface emissivity are shown in FIGS. 16 and 17, drawn at the same scale as the previous plots. As expected from the case for surface temperature, the first-order analytical model for standard deviation and the second-order analytical model for bias are adequate for estimating error statistics of retrieved surface emissivity out to noise levels of 3 $\mu W/cm^2$-sr-$\mu m$.

Figure 18:
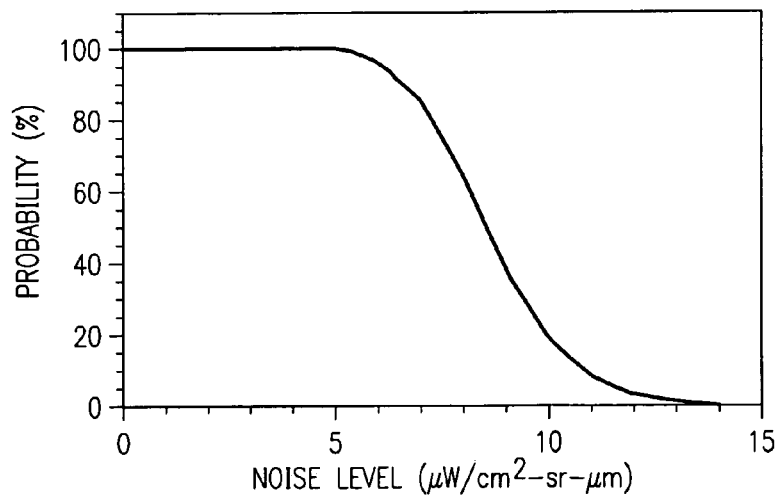
FIG. 18 is a plot of probability versus noise level illustrating frequency of convergence versus noise level.

As the noise level increases, the noise pattern begins to interfere with the spectral pattern of atmospheric features, so that at some noise value the algorithm will start failing to converge, or will converge but to an improbable value. The standard deviation and bias for retrieved temperature/emissivity for a given noise level were estimated from the analytical model, and a range of five standard deviations about the bias was chosen. If the retrieved surface temperature for a point in an ensemble was within this range, then the algorithm was deemed to have converged successfully. The frequency of successful convergence for ensembles with varying noise levels was calculated, and the results are shown in FIG. 18. ISSTES showed successful convergence for noise levels up to about 5 $\mu W/cm^2$-sr-$\mu m$, or equivalent SNR of about 150:1.

A second-order analytical model and Monte Carlo simulation of the sensitivity of the ISSTES algorithm to uncorrelated gaussian instrument noise have been described. For a given scenario, these techniques estimate the standard deviation and bias of surface temperature and emissivity retrieved by the ISSTES algorithm, and the noise levels at which algorithm convergence begins to fail. As an example, error statistics were computed for the case of a low-emissivity (0.65) surface at 300 K imaged by the SEBASS LWIR instrument from 2500 ft. through a warm humid atmosphere. With an SNR of about 1200:1 in this case, the contribution of instrument noise to the standard deviation and bias of retrieved surface temperature were 0.18 K and 0.03 K respectively, and the contribution to the standard deviation and bias of retrieved surface emissivity were in the ranges 0.002–0.004 and −0.0004—0.0008 respectively.

The standard deviation of retrieved surface temperature and emissivity scale is approximately linear up to a noise level of 3 $\mu W/cm^2$-sr-$\mu m$, or equivalently down to an SNR of about 240:1 for this scenario. The bias also varies approximately quadratically with noise level within the same range. ISSTES should give approximately unbiased surface temperature and emissivity estimates for noise levels below about 1 $\mu W/cm^2$-sr-$\mu m$ (SNR>720:1) Higher noise levels could result in significant biases, due to non-linearity of the inversion within the radiance error bars.

Based on the close agreement between the analytical and Monte Carlo error estimates for the ISSTES algorithm, the analytical error computation can be integrated into an ISSTES software package. This software not only performs surface temperature and emissivity retrievals on SEBASS data but also supplies the standard deviation of retrieved values as a product quality figure-of-merit.

While the invention has been described in connection with a preferred embodiment, it is not intended to limit the scope of the invention to the particular form set forth, but, on the contrary, it is intended to cover alternatives, modifications, equivalents as may be included within the spirit and scope of the invention as defined in the appended claims.

What is claimed is:

1. A method for estimating the error statistic for retrieved temperature and emissivity of a surface material, comprising:
    determining a second order analytical error propagation for a surface temperature and a surface emissivity of a surface material;
    retrieving the surface temperature and the surface emissivity from a sufficiently large ensemble of radiance spectra by Monte Carlo simulation; and
    determining an error statistic in the retrieved surface temperature and the retrieved surface emissivity arising from random instrument noise, the error statistic being based at least in part on a selected one of the second order analytical error propagation or the Monte Carlo simulation, the selection based on a noise level.

2. The method for estimating the error statistic as in claim 1, wherein determining the second order analytical error propagation comprises determining the covariance and bias surface temperature and emissivity errors retrieved utilizing an ISSTES algorithm.

3. The method for estimating the error statistic as in claim 1, wherein retrieving the surface temperature and the surface emissivity by Monte Carlo simulation comprises generating an unbiased ensemble of measurement errors for a covariance of measured variables.

4. The method for estimating the error statistic as in claim 3, wherein retrieving the surface temperature by Monte Carlo simulation comprises adding errors to produce an ensemble simulating the results of making the same measurement many times.

5. The method for estimating the error statistic as in claim 4, wherein retrieving the surface temperature by Monte Carlo simulation further comprises evaluating an ensemble of measurement utilizing the function F(X) to generate an ensemble of dependent variables.

6. The method for estimating the error statistic as in claim 5, wherein retrieving surface temperature by Monte Carlo simulation further comprises estimating the mean, bias and variance of dependent variables.

7. The method for estimating the error statistic as in claim 6, wherein retrieving the surface temperature by Monte Carlo simulation further comprises retrieving surface temperature and emissivity for each spectrum in an ensemble.

8. The method for estimating the error statistic as in claim 1, wherein determining the second-order analytical error propagation comprises translating a radiance error of a surface material into a diagonal covariance matrix.

9. The method of claim 1, further comprising, applying the error statistic to the retrieved surface temperature and the retrieved surface emissivity to determine a corrected surface temperature and a corrected surface emissivity.

10. An optical sensing system, comprising:
    an instrument operable to retrieve a surface temperature and a surface emissivity from an ensemble of radiance; and a processing device operable to estimate an error statistic in the received surface temperature and the received surface emissivity arising from random instrument noise, the estimated error statistic being based at least in part on a selected one of a second-order analytical propagation or a Monte Carlo simulation, the selection based on a noise level.

11. The optical sensing system of claim 10, wherein the instrument operates to receive the ensemble of radiance, the ensemble of radiance representing the surface temperature and the surface emissivity of a terrestrial surface.

12. The optical sensing system of claim 10, wherein the instrument comprises a spectrometer.

13. The optical sensing system of claim 10, wherein the instrument comprises an ISSTES algorithm capable of retrieving the surface temperature and the surface emissivity from the ensemble of radiance.

14. The optical sensing system of claim 13, wherein the random instrument noise is no more than one (1) $\mu W/cm_2$-sr-$\mu m$ and wherein the ISSTES algorithm provides unbiased surface temperature and unbiased surface emissivity retrievals.

15. The optical sensing system of claim 10, wherein the ensemble of radiance comprises airborne hyperspectral thermal infrared data associated with a terrestrial surface.

16. The optical sensing system of claim 10, wherein the processing device operates to determine a corrected surface temperature and a corrected surface emissivity by applying the error statistic to the retrieved surface temperature and the received surface emissivity.

17. The optical sensing system of claim 10, wherein the random instrument noise is no more than five (5) $\mu W/cm_2$-sr-$\mu m$.

18. The optical sensing system of claim 10, wherein the second-order analytical propagation estimates a bias of the received surface temperature and the received surface emissivity.

19. The optical sensing system of claim 10, wherein the estimated error statistic is based at least in part on a first-order analytical propagation, the first-order analytical propagation capable of estimating a standard deviation of the received surface temperature and the received surface emissivity.

20. A system for estimating the error statistic of a surface material, comprising:
  means for retrieving a surface temperature and a surface emissivity from a sufficiently large ensemble of radiance; and
  means for estimating an error statistic in the received surface temperature and the received surface emissivity arising from random instrument noise, the estimated error statistic being based at least in part on a selected one of a second-order analytical propagation or a Monte Carlo simulation, the selection based on a noise level.

21. A system for estimating an error statistic of a surface material, comprising:
  a computer system having a processor;
  a computer readable medium coupled to the computer system, the computer readable medium comprising a program operable, when executed on the processor, to:
    retrieve a surface temperature and a surface emissivity from a sufficiently large ensemble of radiance; and
    estimate an error statistic in the received surface temperature and the received surface emissivity arising from random instrument noise, the estimated error statistic being based at least in part on a selected one of a second-order analytical propagation or a Monte Carlo simulation, the selection based on a noise level.

* * * * *